United States Patent [19]

Hackett

[11] Patent Number: 5,697,289

[45] Date of Patent: Dec. 16, 1997

[54] COOKING APPLIANCE

[76] Inventor: Kenneth Paul Hackett, 11282 Buffalo Dr., Riverside, Calif. 92505

[21] Appl. No.: 505,116

[22] Filed: Jul. 21, 1995

[51] Int. Cl.[6] .................................................. A47J 34/00
[52] U.S. Cl. .................................. 99/339; 99/393; 99/400; 99/401; 99/443 R
[58] Field of Search .............................. 99/339, 340, 386, 99/393, 391, 401, 443 R, 443 C, 450, 377, 396, 395, 427, 400; 126/41 R, 41 A, 41 B

[56] References Cited

U.S. PATENT DOCUMENTS 2,646,495  7/1953  Dornbush ............................ 99/393
3,604,338  9/1971  Fiedler ................................. 99/393
5,371,829  12/1994  Hoeberigs ........................ 99/443 R Primary Examiner—David Scherbel
Assistant Examiner—Reginald L. Alexander
Attorney, Agent, or Firm—Luedeka, Neely & Graham, P.C.

[57] ABSTRACT

A broiler type grilling appliance oscillates the food supporting grille under a heat source zone so that the broiled food subject receives direct heat incidence from the heat source for only a portion of a controlled, periodic cycle. Additionally, the supporting grille is guided to oscillate over the arc of a large radius circle that subtends a chord having a 15° to 25° angle from the horizontal.

7 Claims, 2 Drawing Sheets

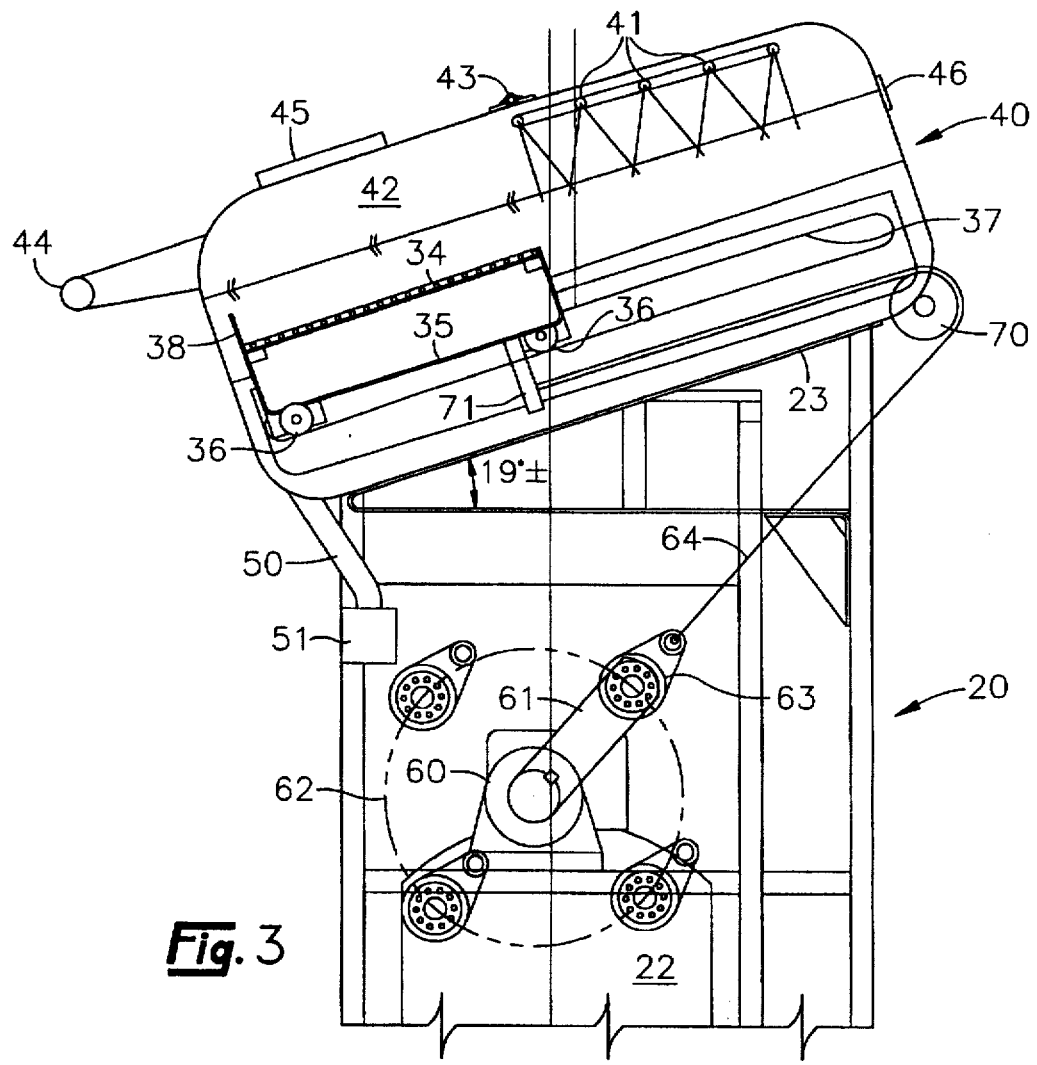
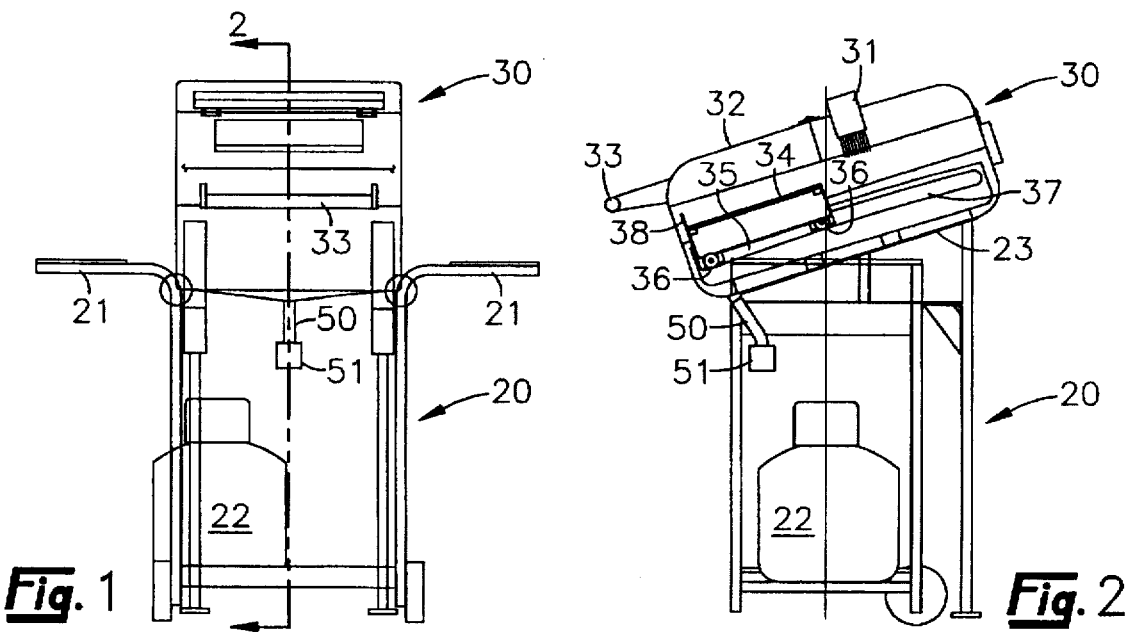

5,697,289

1

COOKING APPLIANCE

BACKGROUND OF THE INVENTION

Field of The Invention

The present invention relates to food preparation and cooking appliances. More particularly, the present invention relates to the process of broiler cooking and related apparatus.

Food in general and meat in particular is traditionally grilled upon a horizontal grate over a heat source that is desirably distributed uniformly under the projected area of the grilling grate. As the meat heats, internal fluids exude to the food surface carrying tallow, lard, other fats and oils, steam, water, blood and fiber.

On the underside of the meat cut, this mixture of exudate falls upon the heat source to be burned or evaporated. On the top side, the exuded fluids merely evaporate leaving the residual exuded solids remaining with the meat cut. These residual solids contribute to the flavor of the cooked product and to some tastes, unfavorably.

It is therefore, an object of the present invention to provide a cooking method and apparatus for removing substantially all of the exudate from grilled food matter.

Another object of the present invention is to provide a method and apparatus for removing exudate from the topside of grilled food matter.

A still further object of the present invention is to provide a new procedure for broiling meats and other food articles, that yield a new and fresh flavor to foods prepared correspondingly.

Yet another object of the present invention is to provide a smokeless meat grilling appliance.

SUMMARY OF THE INVENTION

These and other objects of the invention to be made apparent from the following description are met by a covered grille appliance wherein the grille surface is reversibly moveable along a guided path under a controlled heat source. The grille guide path is inclined to the horizontal at an angle of about 15° to about 25° and preferably arced about a long radius that subtends a chord of a circle that is inclined to the horizontal at about 15° to about 25°.

Connected to the moveable grille surface is a reversible translation mechanism which may be reciprocatory or oscillatory or a combination of both. Preferably the reversing mechanism has an adjustable period and stroke capacity.

Direct incidence of the overhead heat falls upon less than half of the grille movement area whereby the food subject receives direct heat over only about half of the oscillation cycle.

The grille support surface for the food subject attaches to a carriage that receives and funnels the cooking exudate into a discharge channel for removal from the food proximity. Due to the extreme angle of the oscillatory plane, top-side exudate is immediately drained from the food surface along with all the solids, dissolved and suspended, carried by the fluidized exudate.

BRIEF DESCRIPTION OF THE DRAWINGS

FIG. 1 is a front elevational view of the present invention in the form of a wheel carried portable appliance.

FIG. 2 is a sectioned side elevational view of the invention taken along cutting plane 2—2 of FIG. 1.

FIG. 3 is a sectional side elevation of a second embodiment of the invention.

DESCRIPTION OF THE PREFERRED EMBODIMENTS

Figure 5:
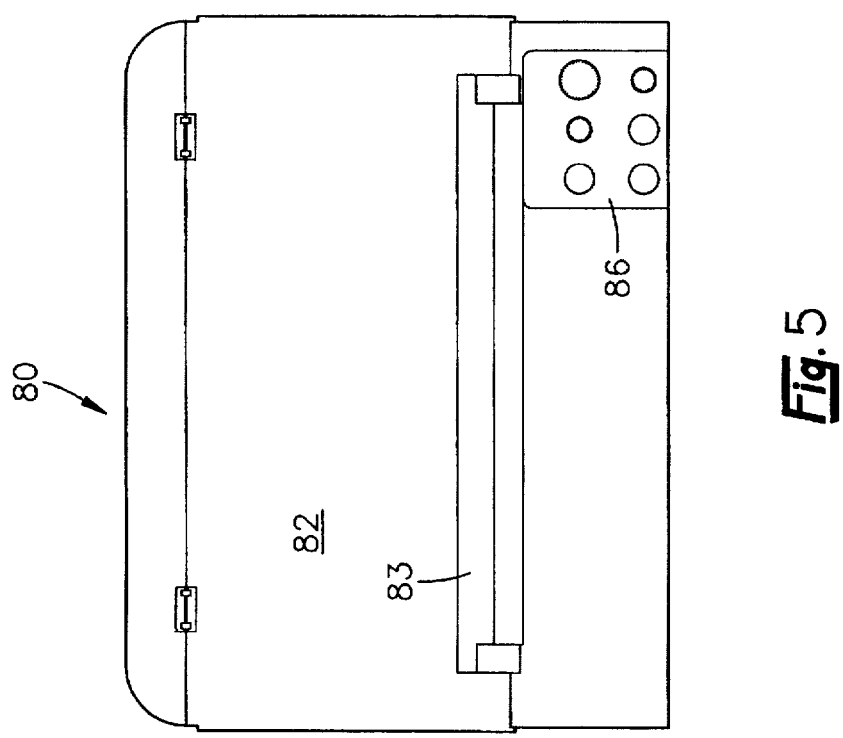
FIG. 5 is a front elevation view of the third embodiment of the invention.

Relative to the drawings wherein like reference characters designate like or similar elements throughout the several figures of the drawings, FIG. 1 shows a first embodiment of the invention 10 secured to wheeled frame 20 having cantilevered exterior shelves 21. A lower, inside shelf supports a fuel gas bottle 22.

With respect to the FIG. 2 section of the invention, an enclosure 30 is secured to an angularly disposed top shelf 23 set approximately 15° to 25° from the horizontal. Preferably, the shelf 23 is set at about 19° to the horizontal.

The enclosure 30 includes a direct heating source 31 which, in this embodiment is a narrow gas burner element. The top, front quadrant of the enclosure comprises a hinged cover 32 having a handle 33.

The food grate 34 covers the top opening of an oscillating tray carriage 35. Wheels 36, rotatable about an axle secured to the carriage 35, are confined to an arched slot-guide 37. Preferably, the slot guide is about 20 in. to about 30 in. long and is arced about a radius that is ten to fifteen times the stroke of the carriage 35; 160 in., for example. More generally, the slot-guide 37 represents an oscillation track for the carriage 35 that approximates a circular arc subtending a chord of the circle. The chord, which is parallel to the top shelf 23, is also set at about 15° to about 25° to the horizontal. Preferably, the maximum radial distance between the plane of the chord and the circle tangent parallel to the chord is about ¼ in.

The front end wall of the carriage 35 extends above the plane of grill 34 to provide an abutment wall 38 for preventing food from sliding or falling off the grate during the moments of direction reversal. The mechanism for providing such direction reversal is described in detail with respect to the FIG. 3 embodiment. Obvious alternatives and supplements to the abutment wall 38 may include a secondary grille, not illustrated, to overlie food on the support grille 34. For meat cuts, small spikes, not illustrated, pointing upward from the top surface plane of the grille 34 may suffice.

The carriage 35 is apertured at the bottom to channel exuded food fluids falling from the food topside into flow line with the enclosure drain duct 50 which delivers the fluid into a removable canister 51. Periodically, the canister is emptied and cleaned.

As an invention refinement, the carriage 35 should be considered a secondary heat source since the carriage mass absorbs heat from the primary source 31 during intervals of direct incidence but radiates such heat to the food underside at a substantially constant rate. By virtue of materials selections and surface coatings, this secondary, underside heat source contribution may be enhanced or suppressed depending on the particular balance of heat transfer characteristics desired.

Enclosure 40 of the second invention embodiment is formed with more rounded corners and shoulders but of the same general configuration as the first embodiment. In this embodiment, there are several burner rows 41 spanning the width of the enclosure and distributed over the top rear quadrant of the enclosure.

The top front of the enclosure is a removable cover 42 that is pivotable about a hinge 43. A handle 44 facilitates the cover and an air louver 45 cooperates with vent 46 to control the draft. A vent 46 area of about 30 in.$^2$ has been found to be minimal. In any case, however, the vent draft should be selectively controllable. Although exuded fat residues seem to be burned during the cooking process, smoke generation is normally not a characteristic of the invention. Consequently, except for control settings of extremely intense heat from the direct heat source 31, the invention may be used indoors depending on safety and local codes regarding the fuel or energy for the direct heat source 31.

A carriage 35 carries the food support grate 34 and abutment wall 38 on wheels 36 that are confined to run in slot guides 37. One or more apertures in the bottom of carriage 35 drains the food fluids onto the enclosure floor where they further drain into the duct 50 and canister 51.

Oscillatory drive for the carriage 35 comprises a motor 60 that rotates a crank arm 61 about a full circle 62. A journal bearing 63 anchors the lower end of a tow cable 64. A sheave 70 secured to the enclosure 40 for rotation carries the tow cable into alignment with a carriage draft bar 71 to which the tow cable 64 is attached.

It will be perceived from the four cyclic positions of the journal bearing 63 that the carriage will cyclicly translate, oscillate or reciprocate along the plane defined by the guide slots over a stroke defined by twice the length of the crank arm 61. Such crank arm length may be adjusted by providing selective attachment points for the journal bearing along the radial length of the crank arm 61. Such stroke adjustment may be combined with a variable speed motor 60 to find a dynamic force combination appropriate for the particular food preparation. An appropriate oscillation rate may be found between 0.5 to 5.0 cycles/min. More particularly, an adjustable cycle range of 1.5 to 3.0 cycles per minute is preferred.

Figure 4:
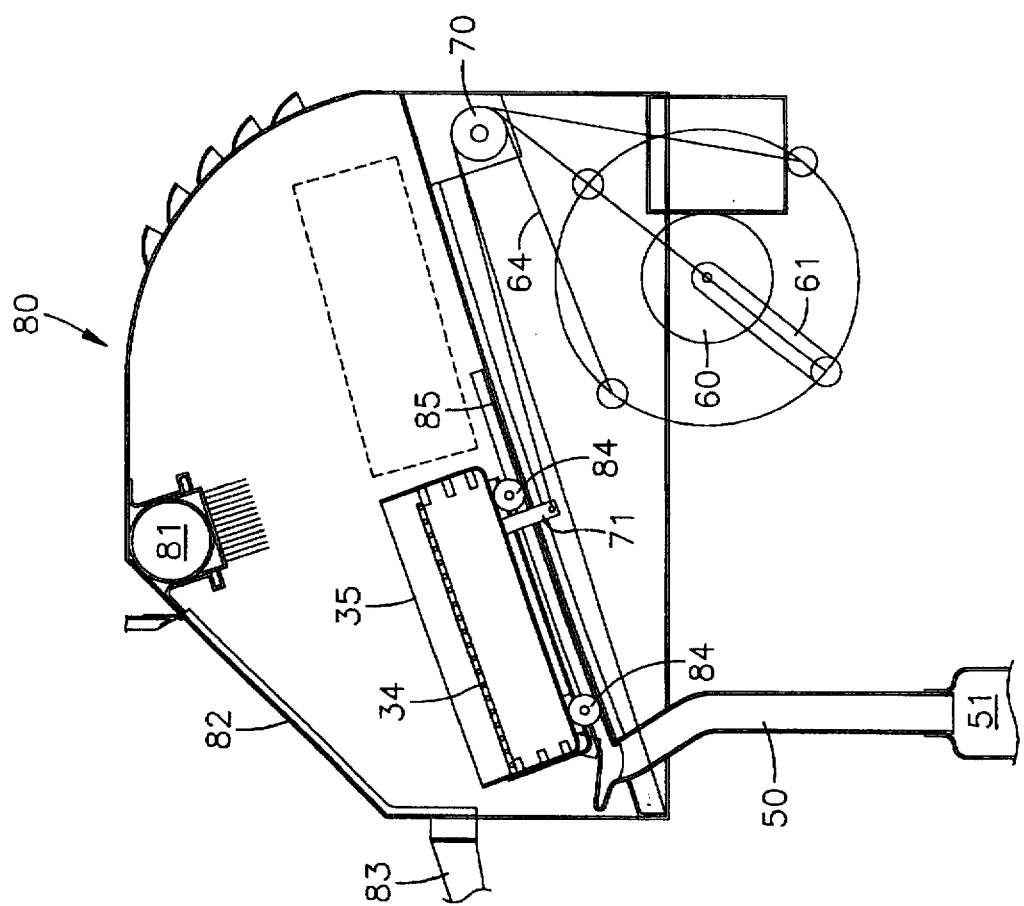
FIG. 4 is a sectioned side elevational view of a third embodiment of the invention.

A third embodiment of the invention illustrated by FIGS. 4 and 5 provides an enclosure having an adjustable, narrow line heat source 81 as described in the first embodiment. A pivoted cover 82 facilitated by handle 83 provides selective access to the interior of the enclosure and to the grille 34 carried by carriage 35.

Oscillation of the FIG. 4 carriage 35 is driven by variable speed motor and crank arm 61 which oscillates a tow cable 64 over sheave 70. The carriage end of the tow cable is anchored to the carriage draft bar 71.

In lieu of slot guides, the FIG. 4 carriage wheels 84 are confined to a reciprocatory path along trackways 85.

Motor and fuel controls for the FIG. 4 and 5 embodiment are conveniently organized in a console display 86 as shown by FIG. 5.

It will be understood that numerous heat sources may be adapted to the invention such as electric heating elements and liquid fuels although gaseous fuels are preferred.

While a tow cable and motor driven crank arm may be the most reliable and least expensive oscillatory drive system for the present invention, it will also be understood that numerous other mechanisms may be used for the same purpose. For example, an opposite hand helix shaft known as a "level drive" may be used for oscillatory motion from a single rotary drive direction. In another example, a motor having a reversing rotational capacity may be used with a traditional single lead screw. Numerous lever and yoke mechanisms are known to produce the adjustable stroke oscillatory motion specified.

Having fully disclosed my invention,

I claim:

1. A cooking appliance having a heat confining enclosure, said enclosure having a cover portion that may be removed from a heat confining position, a grille surface within said enclosure mounted for movement that is guided along a plane that arcs about a horizontal plane, a heat source positioned above the plane of grille surface movement and drive means to reversibly move said grille surface by a stroke distance along said plane over a substantially periodic cycle.

2. A cooking appliance as described by claim 1 wherein the period of said cycle is adjustable.

3. A cooking appliance as described by claim 1 wherein the stroke distance of said reversible grille movement is adjustable.

4. A cooking appliance as described by claim 1 wherein heat from said heat source impinges directly upon less than half of the area of said movement plane.

5. A cooking appliance as described by claim 1 wherein said movement plane is arced over a large radius.

6. A cooking appliance as described by claim 5 wherein said radius is about ten to fifteen times the distance of said grille movement.

7. A cooking appliance as described by claim 1 wherein the arc of said grille surface movement plane rotates said grille surface from about 15° to the horizontal.

\* \* \* \* \*